US009190890B2

(12) United States Patent
Allen et al.

(10) Patent No.: US 9,190,890 B2
(45) Date of Patent: Nov. 17, 2015

(54) METHOD AND APPARATUS FOR REMOVAL AND REPLACEMENT OF A WOUND STATOR CORE

(71) Applicants: David Thomas Allen, Longwood, FL (US); Travis John Vitello, Oviedo, FL (US)

(72) Inventors: David Thomas Allen, Longwood, FL (US); Travis John Vitello, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 249 days.

(21) Appl. No.: 13/769,448

(22) Filed: Feb. 18, 2013

(65) Prior Publication Data

US 2014/0230235 A1    Aug. 21, 2014

(51) Int. Cl.
| | | |
|---|---|---|
| H02K 15/00 | (2006.01) |
| H02K 15/02 | (2006.01) |
| H02K 15/10 | (2006.01) |
| H01F 3/04 | (2006.01) |
| H01F 7/06 | (2006.01) |
| B23P 19/00 | (2006.01) |
| H05K 13/04 | (2006.01) |

(52) U.S. Cl.
CPC .......... *H02K 15/0006* (2013.01); *H02K 15/024* (2013.01); *Y10T 29/49009* (2015.01); *Y10T 29/53274* (2015.01)

(58) Field of Classification Search
CPC ................... Y10T 29/49009; Y10T 29/49012; Y10T 29/49078; Y10T 29/5313; Y10T 29/53143
USPC ............................. 29/596, 598, 609, 729, 732
See application file for complete search history.

(56) References Cited

U.S. PATENT DOCUMENTS

| | | | | |
|---|---|---|---|---|
| 5,875,540 | A * | 3/1999 | Sargeant et al. | 29/596 |
| 6,201,334 | B1 | 3/2001 | Sargeant et al. | |
| 6,321,439 | B1 * | 11/2001 | Berrong et al. | 29/596 |
| 6,796,021 | B2 * | 9/2004 | Fuller | 29/732 |
| 7,302,754 | B2 | 12/2007 | Majernik et al. | |
| 7,353,586 | B2 | 4/2008 | Majernik et al. | |
| 7,484,290 | B2 * | 2/2009 | Henley | 29/598 |
| 7,653,986 | B2 | 2/2010 | Majernik et al. | |
| 7,716,817 | B2 * | 5/2010 | Mall et al. | 29/732 |
| 7,818,872 | B2 * | 10/2010 | Dailey et al. | 29/596 |
| 7,946,028 | B2 | 5/2011 | Majernik et al. | |
| 8,220,138 | B2 | 7/2012 | Majernik et al. | |
| 8,319,405 | B2 * | 11/2012 | Allen et al. | 310/431 |
| 8,714,534 | B2 * | 5/2014 | Vitello et al. | 269/55 |
| 8,813,333 | B2 * | 8/2014 | Vitello et al. | 29/402.08 |
| 8,829,760 | B2 * | 9/2014 | Tanavde et al. | 310/216.129 |

(Continued)

FOREIGN PATENT DOCUMENTS

| | | |
|---|---|---|
| DE | 19637724 A1 | 3/1998 |
| EP | 0690547 A2 | 1/1996 |

*Primary Examiner* — David Angwin (57) ABSTRACT

Removing a generator core (10) from a frame (24) includes removing electrical and mechanical connections between the core and components external to the frame; installing a lift support assembly (34, 38, 42, 46) outboard of the core at each of an exciter end and a turbine end of the frame; installing a pilot shaft support assembly (50, 70, 73) between an inner surface of a core bore (10D) and an outer surface (40A) of a pilot shaft (40) at each of the exciter end and the turbine end of the frame; installing the pilot shaft through the first and second pilot shaft support assemblies and the core bore, the pilot shaft supported by the lift support assembly at the exciter end and the turbine end; decoupling the core and the frame; and activating a force-producing device (90) to slide the core out of the frame.

19 Claims, 9 Drawing Sheets

(56) References Cited

U.S. PATENT DOCUMENTS

| | | | |
|---|---|---|---|
| 8,912,704 B2* | 12/2014 | Petter et al. | 310/216.112 |
| 2005/0235480 A1* | 10/2005 | Majernik et al. | 29/596 |
| 2005/0236926 A1* | 10/2005 | Majernik et al. | 310/259 |
| 2008/0115347 A1* | 5/2008 | Majernik et al. | 29/732 |
| 2010/0115762 A1 | 5/2010 | Majernik et al. | |
| 2011/0214281 A1 | 9/2011 | Majernik et al. | |

* cited by examiner

METHOD AND APPARATUS FOR REMOVAL AND REPLACEMENT OF A WOUND STATOR CORE

FIELD OF THE INVENTION

The present invention relates to electric power generators and more specifically to methods and apparatuses for removing and replacing a wound stator core as a single unitary structure.

BACKGROUND OF THE INVENTION

The generator stator core is the largest monobloc component in a turbine-generator set. The stator core comprises thousands of thin steel laminations (also referred to as "punchings") stacked horizontally and clamped together to form a cylindrical stator core disposed within a generator frame. Each lamination defines a central opening and thus when stacked an axial opening extends through the core. The laminations are held together by a plurality of axial through-bolts that extend from end-to-end through the core.

A rotor is disposed within the central opening and mechanically rotated by a rotating turbine. The rotor is responsive to an electrical current such that rotation generates electric current in stator windings. The stator current is supplied to a plurality of main and neutral electrical leads mounted to the generator frame then to electrical loads through a transmission and distribution system.

Core laminations or punchings are stacked vertically at the factory. After stacking is complete the core is maneuvered into a horizontal orientation or retained in the vertical orientation and loaded into the generator frame. In lieu of stacking individual punchings, a plurality of bonded laminations (referred to as a "donut") can be vertically stacked to form the core.

Steady-state and transient forces generated during normal operation and transient conditions impose substantial forces on the stator core. These forces can distort the core geometric shape, cause the laminations to vibrate, and damage the core, rotor and/or frame. Also, mechanical fatigue caused by these forces can lead to premature failure of the generator.

To avoid these effects, the generator frame is fixed to a stable support such as the floor of a power plant and the stator core is solidly affixed to the generator frame. Two different attachment techniques and corresponding attachment components are employed to affix the core to the frame.

Keybars are used in one attachment technique. These long, axial members are disposed along an outer circumference of the stator core, specifically within slots along the outer circumference. The radially inwardly facing surface of each keybar is held within a slot by a geometrically capturing interfacing shape (for example a dovetail shape). A radially outwardly facing surface of each keybar is attached to the stator frame using various intermediate hardware components.

One such intermediate attachment component comprises a resilient spring bar. Several spring bars are distributed circumferentially around an interior surface of the frame and each spring bar extends axially through the frame. A first surface of each spring bar is attached to radially inwardly facing generator frame ribs and an opposing second surface of each spring bar is attached to a key bar mounting block or plate. The key bar block or plate is attached to the keybar. Thus the keybars are not attached directly to the generator frame but instead are attached through the spring bars.

The end of each keybar (both the exciter end and the turbine end) comprises a threaded portion for receiving a threaded nut and washer. The nuts are tightened to provide a clamping force to the stator core.

A second common attachment technique employs attachment hardware referred to as building bolts. A building bolt is a long, axial rod having one surface attached to the outer circumference of the stator core through a geometrically capturing interface, and an opposing surface welded to a plurality of generator frame ribs. Each building bolt includes a threaded portion at both the turbine end and the exciter end.

The building bolts are installed and attached to the frame ribs prior to insertion of the stator iron. The stator core iron (in the form of individual laminations also referred to as punchings or a plurality of bonded laminations referred to as donuts) is then stacked on the building bolts. A nut is tightened to provide a clamping force to the stator core.

Figure 1:
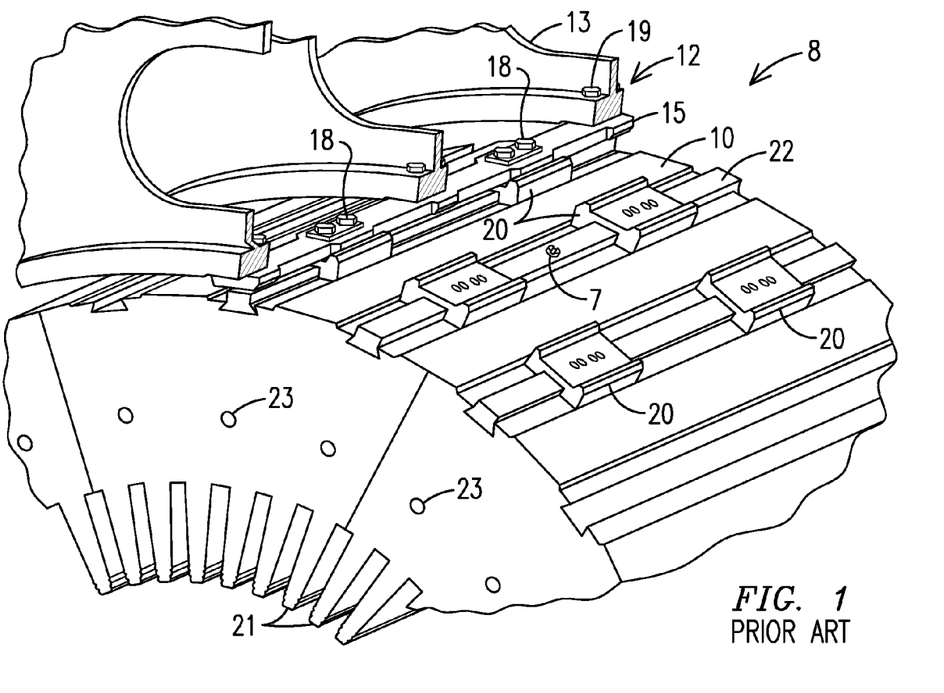
FIG. 1 illustrates a prior art stator core within a generator frame.

FIG. 1 is a partial cutaway perspective view of a prior art electric generator 8 and a stator core 10 mounted within generator frame 12. Only certain pertinent components of the frame 12 are illustrated in FIG. 1. FIG. 1 further illustrates a plurality of spring bars 15 distributed around a circumference of the core 10. A first surface of each spring bar 15 is attached to a plurality of frame rings 13 by a fastener 19. The frame rings 13 are in turn welded to an inside surface of the generator frame 12.

Each spring bar 15 extends an axial length of the core 10. At a plurality of axially-distributed core locations a second surface of each spring bar 15 is attached to a key bracket or key block 20 using fasteners 18. Each key block 20 spans a width of a keybar 22 and a plurality of key blocks 20 are axially distributed along each keybar 22.

The keybars 22 are fixedly captured with the core 10 by a geometrically capturing interface with a groove defined in an outer surface of the core 10. The keybars 22 and the core grooves are shaped such that the keybars 22 are captured within the groove by the geometric capture feature, such as the illustrated dovetail shape. A fastener 7 is tightened to provide additional forces to secure the keybar 22 to the core 10. Thus the core 10 is connected to the generator frame by serial coupling of the keybars 22 geometrically retained within core grooves, the key blocks 20 and the spring bars 15.

Stator windings (also referred to as stator bars, but not illustrated) are disposed within winding slots 21. Through-bolts (not shown) extend axially through openings 23. The through-bolts and mating nuts (neither illustrated in FIG. 1) cooperate to exert inwardly-directed axial clamping forces on core end plates and the laminations that comprise the core 10.

As those skilled in the art are aware, several techniques and apparatuses are known for removing a stator core from a generator frame. According to one technique, first the rotor and the stator windings are removed. Where sufficient space and lifting capability are available (at the factory for example or at certain field locations), the generator frame is rotated into a vertical position using a crane or other hoisting device coupled to a lifting plate affixed to a first axial end of the core. Hydraulic jacks are then placed on a supported surface and extended vertically upwardly through the frame face to contact the core end plate at a second axial end of the core. By removing the fasteners 18, the keybars 22 are separated from the spring bars 15, separating the core 10 from the frame 24. The jacks are then activated to apply a vertically upward force to assist the crane or other hoisting device to vertically remove the core from the frame.

When vertically lifting the stator core, care must be taken to avoid damaging either the core or the generator frame by inadvertent contact during the lifting process. Given the relatively large diameter, axial length and weight of the stator core, and the relatively small radial clearance with the generator frame a small yaw of the stator core during the hoisting operation may cause an inadvertent impact with the frame. Cranes, hoists and similar heavy moving equipment are expensive to purchase or lease, require logistics planning to have them available on site when needed and further require skilled operating engineers.

To remove the core while maintained in a horizontal orientation, the rotor and stator windings are removed. The punchings (or donuts) are individually removed while the core-to-frame attachment components remain in place (i.e., the keybars or the building bolts), effectively piecewise simultaneously removing and disassembling the core from within the frame.

After the core is removed, a new core or a refurbished core is installed, again according to a piecewise process. First the punchings or donuts are individually installed on the key bars or building bolts. The remaining core iron components (i.e., interlaminar loading members, through bolts, end plates and finger plates (a steel structure that transfer the axial core clamping load directly to the stator punchings, the finger plates have a surface profile that mimics the surface profile of the punchings) are installed to complete the core.

Then the windings, including winding bars, winding slot components, parallel rings and end winding support structures are installed. This installation process is conventionally done with the core in a horizontal orientation.

As can be seen from this description, and as known by those skilled in the art, the piecewise removal and installation of a stator core is a time and labor intensive operation.

BRIEF DESCRIPTION OF THE DRAWINGS

The invention is explained in the following description in view of the drawings that show.

DETAILED DESCRIPTION OF THE INVENTION

This invention relates to methods and apparatuses for performing removal and replacement of an entire wound stator core (i.e., with the stator windings in place) while maintained in a horizontal orientation. No similar processes and apparatuses are known. The removed core is replaced with the same core, after having been refurbished, or a new core with mechanically and electrically substantially equivalent characteristics.

According to this invention, both the removal and replacement are accomplished with the core in a horizontal (near horizontal or non-vertical) orientation, avoiding the need for expansive floor space and heavy crane rigging. Only minimal disassembly of certain core components is required before the core is removed. In addition to core replacement, removal of the core allows the servicing or repairing of generator frame internal components.

The invention is described for use with a generator core using spring bar assemblies to affix the core to the frame. However the principles of the invention can be applied to other dynamoelectric machines especially those in which the entire core can be separated from its frame as a single piece.

A removal and reinstallation sequence, and associated apparatuses, are set forth below. However, the specified sequence may be modified to facilitate field requirements and limitations, and the invention is not so limited.

The generator rotor is supported within the stator by bearing blocks at both the turbine end (TE) and exciter end (EE). To begin the core removal sequence according to the present invention, a bearing block upper half on both the exciter and turbine ends is removed. During generator operation the rotor rotates within the bearing brackets, which comprise upper and lower half bearing brackets at both the TE and EE. The rotor and the exciter (that supplies current to the rotor for developing a rotor magnetic field), are then removed.

Figure 2:
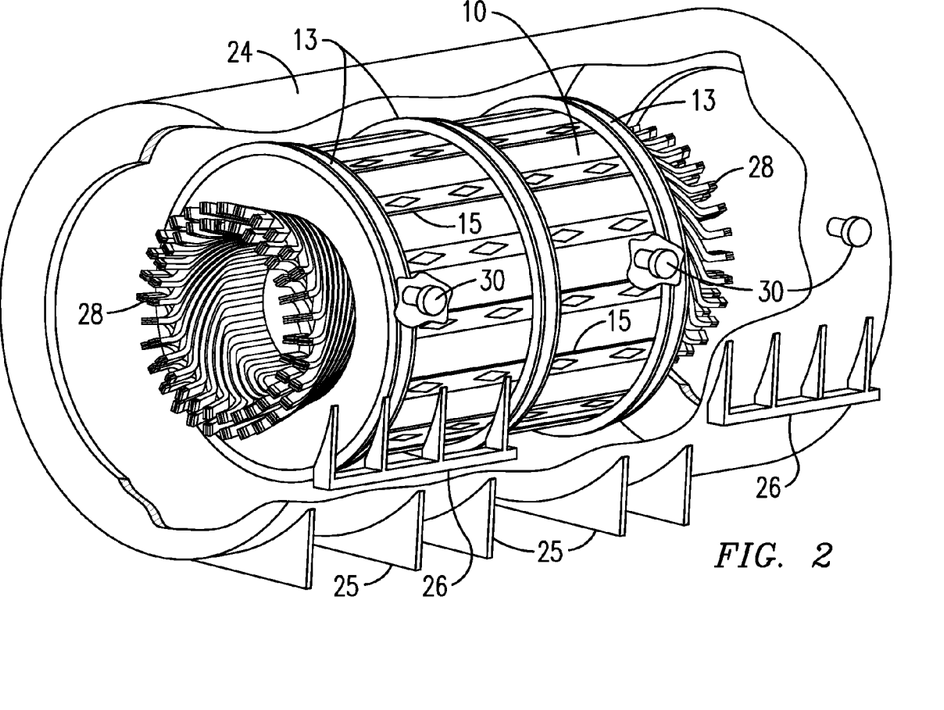
FIGS. 2-13 illustrate structures associated with each step of a method for removing and installing a wound stator core.

FIG. 2 illustrates the generator frame 24, external ribs 25 that stiffen the frame underbelly and frame feet 26 (one at each corner of the frame 24). Typically, the generator frame is suspended over a pit (not shown) disposed below the turbine deck (also not shown in FIG. 2). The frame feet 26 set on the higher turbine deck. The external ribs 25 span approximately 5:30 to 6:30 (using a clock face as a reference) for providing underbelly support to the frame 24 and do not rest upon any surface. The frame feet 26 are disposed at about the 4:30 and 7:30 positions for providing frame support on the turbine deck. For the sake of clarity and to avoid obscuring other components, the external ribs 25 and the frame feet 26 are not illustrated in subsequent figures.

The spring bars 15 cooperate with the key bars, the key blocks and fasteners (none visible in FIG. 2, but see FIG. 1) to secure the core 10 to the generator frame 24. The stator windings are hidden from view as they are disposed within the winding slots 21 (see FIG. 1), but winding ends (at both the TE and the EE) 28 are illustrated.

FIG. 2 illustrates three frame rings 13 although a generator to which the teachings of the present invention can be applied may have more than three frame rings depending on the frame length. Further the rings may not be equally spaced along the frame axis.

According to one embodiment, the process proceeds as follows.

1. Install lifting trunnions 30 to side surfaces of the frame 24 at either pre-existing or selected mounting locations. Typically the trunnions are located at 3 and 9 o'clock opposing positions on the frame 24. FIG. 2 illustrates only the trunnions 30 located at the 3 o'clock position. For the sake of clarity and to avoid obscuring other important components, the trunnions are illustrated only in FIG. 2.

2. Disassemble all external piping and electrical connections between the frame 24 and external components. The external piping may be an element of a generator cooling system or another generator auxiliary system such as for the supply or drainage of oil. Purge gases, such as nitrogen or $CO_2$, may also be supplied to internal regions of the generator frame through this piping. This step frees the frame and its core from all external components thereby permitting the frame 24 to be raised.

Figure 3:
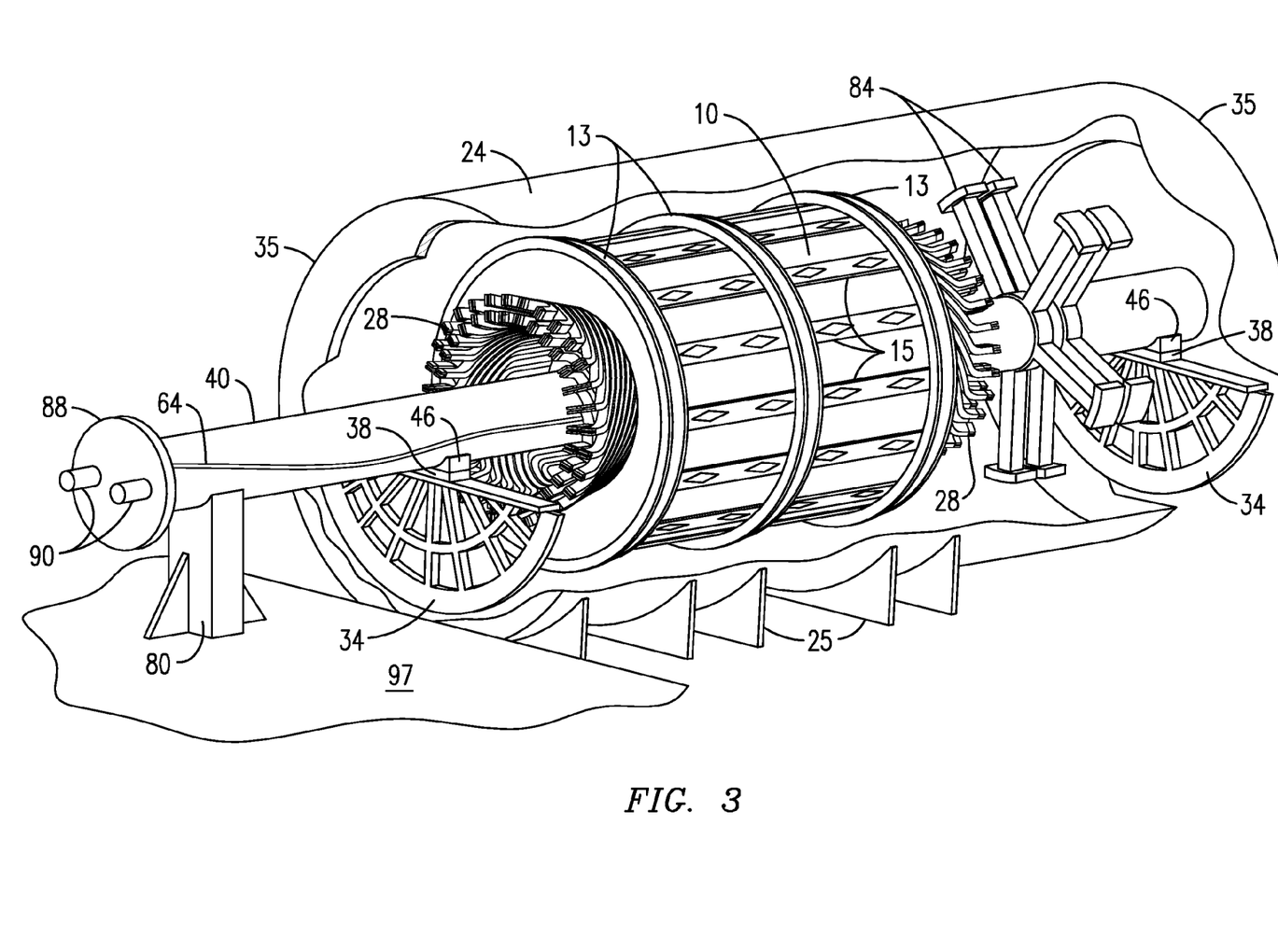

3. Raise the frame 24 to an elevation that allows the core 10 (including the stator windings) to be withdrawn through the exciter end frame face. As described above, the generator frame is suspended over a pit and in such installations this step is required to permit horizontal core removal. The lifting operation may be accomplished by jacking the frame 24 using jacking tools (not illustrated) placed under the trunnions 30, with these tools resting on the turbine deck floor. After lifting, the frame 24 is supported by the trunnions 30 resting on the jacking tools. The jacking tools distribute the frame load to the turbine deck, which is typically a reinforced concrete foundation, and provide a vertical adjustment capability for raising or lowering the frame. FIG. 3 illustrates the frame 24 after the lifting operation has been completed, but the trunnions and jacking tools, which now support the frame, are not shown in FIG. 3. This support technique may be supplemented by additional reinforcement members, such as an overhead crane.

4. Remove lower half bearing brackets (not illustrated), at both the EE and TE, from the generator frame.

5. Disconnect the parallel rings near the main lead interface (the main leads extending externally from the generator frame) such that interference is eliminated when the wound stator core is later removed from the frame. In some applications, this step may require cutting main lead connections to the parallel rings.

6. Install lift support brackets 34 (see FIG. 3) on both EE and TE frame end rings 35. Preferably, the lift support brackets 34 have bolt hole patterns that bolt to an outboard surface of each frame end ring 35 at bolt hole locations that were used to attach the lower bearing brackets, which were removed at step 4. In one embodiment the lift support brackets 34 comprise a lip 34A that allows the lift support brackets 34 to transfer the vertical load of the wound stator core onto an inner surface 35A of each frame end ring 35. See the close-up view of FIG. 4. Without the lip 34A the vertical core load would be imparted to the bolts (such as a bolt 36) that secure the support brackets 34 to the frame end ring 35 and each bolt would thereby experience a shear force. The lip 34A avoids these significant shear forces.

7. Install a lift block 38 on each lift support bracket 34 at the EE and TE. See FIG. 3 and the close-up view of FIG. 5. The lift blocks 38 exert an upward vertical force to a pilot shaft 40 (described in further detail below) as the core 10 is axially withdrawn from the frame 24 by traversing along the pilot shaft 40 as explained further below. Each lift block 38 may comprise a plurality of segments, with segments 38A and 38B illustrated in FIGS. 3 and 5. A threaded member 42 is tightened to drive the lift block segments 38A and 38B together.

The lift block segments 38A and 38B present a tapered interface (see respective tapered surfaces 36AA and 36BB) with a shaft saddle 46 disposed above the lift blocks 38A and 38B. An upper curved surface 46A of the shaft saddle 46 contacts the pilot shaft 40. See especially FIG. 5. When the blocks 38A and 38B are brought together, the contact region moves along the tapered surfaces 38AA and 38BB. The bottom surface of the lift blocks 38A and 38B is flat and as such these bottom surfaces maintain the same planar position as the blocks 38A and 38B are brought closer together during the tightening process. The tapered interface with the lift blocks 38A and 38B raises (lowers) the shaft saddle 46 (and therefore the pilot shaft 40) by tightening (loosening) the threaded member 42. Raising or lowering the pilot shaft 40 may be advantageous to more precisely ensure that the pilot shaft is properly positioned relative to the various core components as the core is withdrawn from the frame along the pilot shaft.

Figures 4, 5:
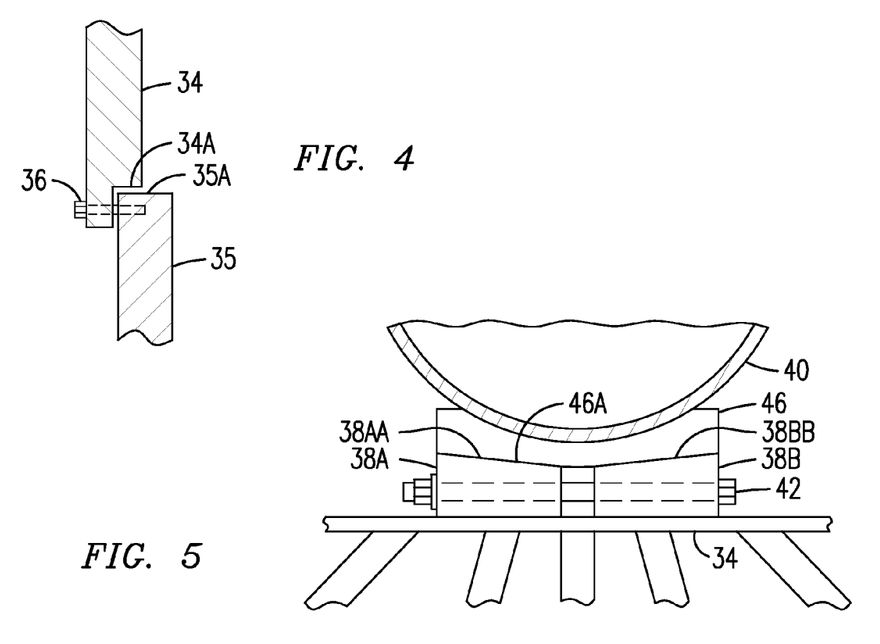

The pilot shaft 40 may rest upon or be attached to the shaft saddle 46. Alternative techniques for developing the upwardly directed force and providing the vertical height adjustment of the pilot shaft may be achieved by employing hydraulic or pneumatic equipment, as is known by those skilled in the art.

Figure 6:
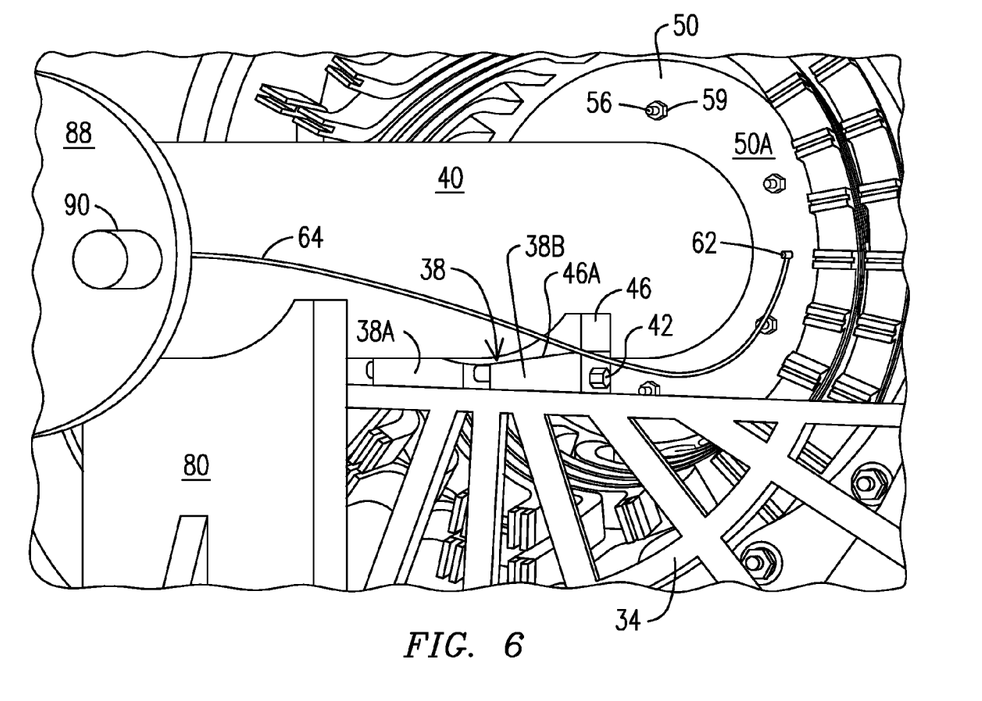

8a. Install an annular pilot shaft support 50 (see FIGS. 6, 7 and 8) through a core bore 10A of the stator core 10 at both the EE and TE. Each annular pilot shaft support 50 circumferentially surrounds the pilot shaft 40 at an end region of the core bore 10A at both the EE and TE. See in particular FIGS. 7 and 8.

Figure 7:
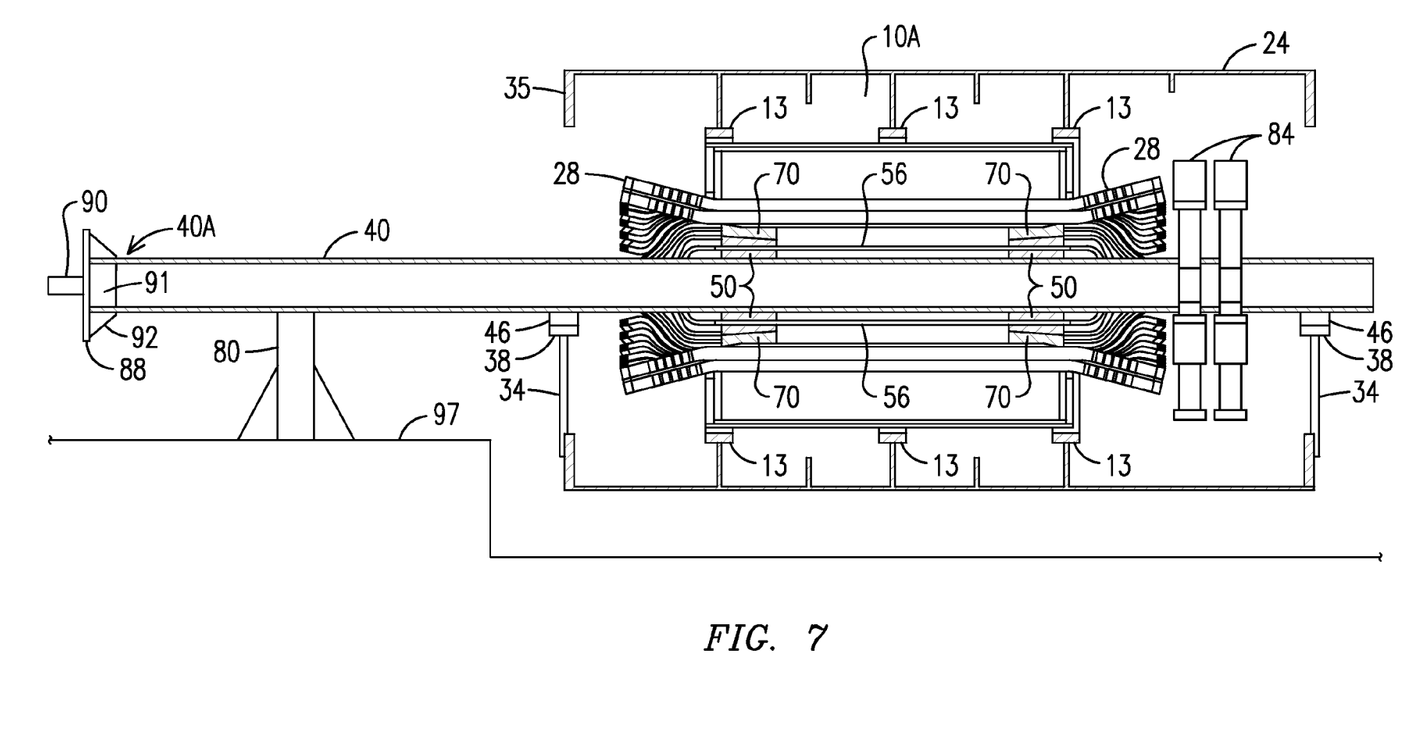
Figure 8:
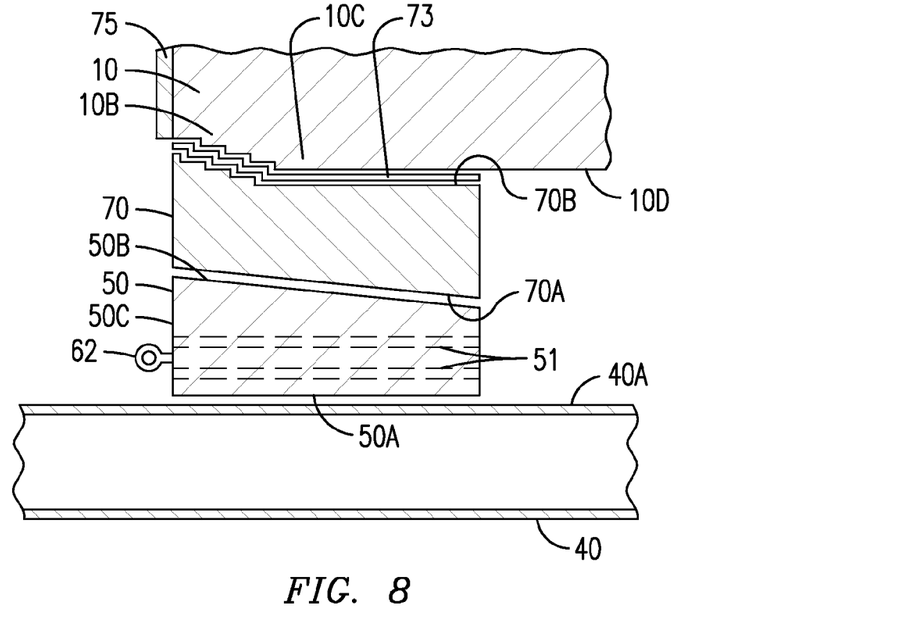

Each pilot shaft support 50 may have the following characteristics:

A machined bushing that can function as a bearing surface to reduce friction as the stator core slides along the pilot shaft 40. An inner circumferential surface 50A that contacts an outer circumferential surface 40A of the pilot shaft 40 with an oil (or equivalent) lubricant at that interface to further reduce the sliding friction. The surface 50A may also be referred to as a bearing/bushing surface. Preferably a non-conducting lubricant is also applied to an outer surface of the pilot shaft 40 prior to its insertion into the core bore 10A. This lubricant, together with the other friction reducing structures and lubricants described herein, reduces friction as the core 10 is moved along the pilot shaft 40.

A tapered outer circumferential surface 50B that interfaces with a core iron load ring 70 as further described below.

A plurality of through-holes 51 for receiving through-bolts 56 of sufficient length to pass through the pilot shaft supports 50 at each of the EE and TE and along a span between the pilot shaft supports. In one embodiment the bolts 56 comprise cylindrical rods with threaded ends that protrude outboard of each pilot shaft support 50. The threaded ends mate with additional fastening hardware components, such as nuts 59 and washers (not shown). Different embodiments of the present invention may comprise a different number of through-holes and associated through-bolts than as illustrated in the Figures.

One or more threaded holes on an outboard face 50C of the pilot shaft support 50 for receiving eyebolts 62 (or a similar component) for in turn receiving a tension cable 64 described in greater detail below. In another embodiment two or more cables, spaced at 180 degrees apart on the pilot shaft support 50 may be used.

8b. Install core iron load rings 70 (see FIGS. 7 and 8) into the core bore 10A at both the TE and EE. In an embodiment, the core iron load rings 70 should have the following characteristics:

A tapered outer circumferential surface 70A for interfacing with a surface 50B of the pilot shaft support 50.

An outer circumferential surface 70B having a profile to interface with stator core step iron region 10B and main body iron region 10C. As can be seen in FIG. 8, the step iron region 10B is the "stepped" region at the TE and EE ends of the stator core (typically the final six to seven inches) while the main body iron region 10C comprises the remainder of the stator core. The step iron region 10B has an incrementally increasing inner diameter.

A layer of compressible, high-strength flexible material 73 (see FIG. 8), such as a combination of synthetic rubber and a fluoropolymer elastomer (e.g., Viton® brand material available from DuPont Performance Elastomers L.L.C. of Wilmington, Del.) applied between an outer surface 70B of the load rings 70 and an inner surface 10D of the stator bore 10 along the step iron region 10B and the main body iron region 10C. This interface between the outer surface 70B and the inner surface 10D should extend axially inboard into the stator bore 10A a distance that achieves sufficient contact with the stator. In one embodiment this distance is about six inches.

The load rings 70 are installed inboard of fingerplates 75 located immediately outboard of the step iron region 10B at TE and EE. The load rings 70 are radially adjusted to establish contact between the material 73 and the inner circumferential surface 10D of the core bore 10.

9. Tighten the annular pilot shaft support 50 on the EE against the pilot shaft support 50 on the TE by tightening the through-bolts 56 depicted in FIG. 7. The tightening action forces the annular pilot shaft supports 50 inboard toward each other and against the tapered interface with core iron load rings 70 (i.e., the interface along the surfaces 50B and 70A). This action forces the load rings 70 radially outwardly thereby compressing the material 73 against the surface 10D of the core 10. See in particular FIG. 8.

In one embodiment it may be desired to lock the through-bolts 56 and their accompanying nuts (not shown in FIGS. 7 and 8) to prevent loosening of the nut on the bolt 56. The locking may be accomplished by staking the through-bolt threads or by applying a thread-locking chemical agent to the threads.

10a. Install the pilot shaft 40 through the frame 24 and the core bore 10A. In one embodiment the pilot shaft 40 comprises a pipe at least 30 inches in diameter with at least a one inch wall thickness. The pilot shaft 40 should extend from a first point slightly beyond the TE frame face to approximately a second point outboard of the EE frame face by a distance of at least the length of the stator. This clearance on both sides of the generator frame 24 allows sufficient space to accommodate the pilot shaft 40 as the core 10 is extracted from the frame 24.

According to other embodiments, the pilot shaft 40 may comprise a unitary shaft or a series of serially attached sub-pieces affixed to provide the functionality of a continuous pilot shaft.

Figure 9:
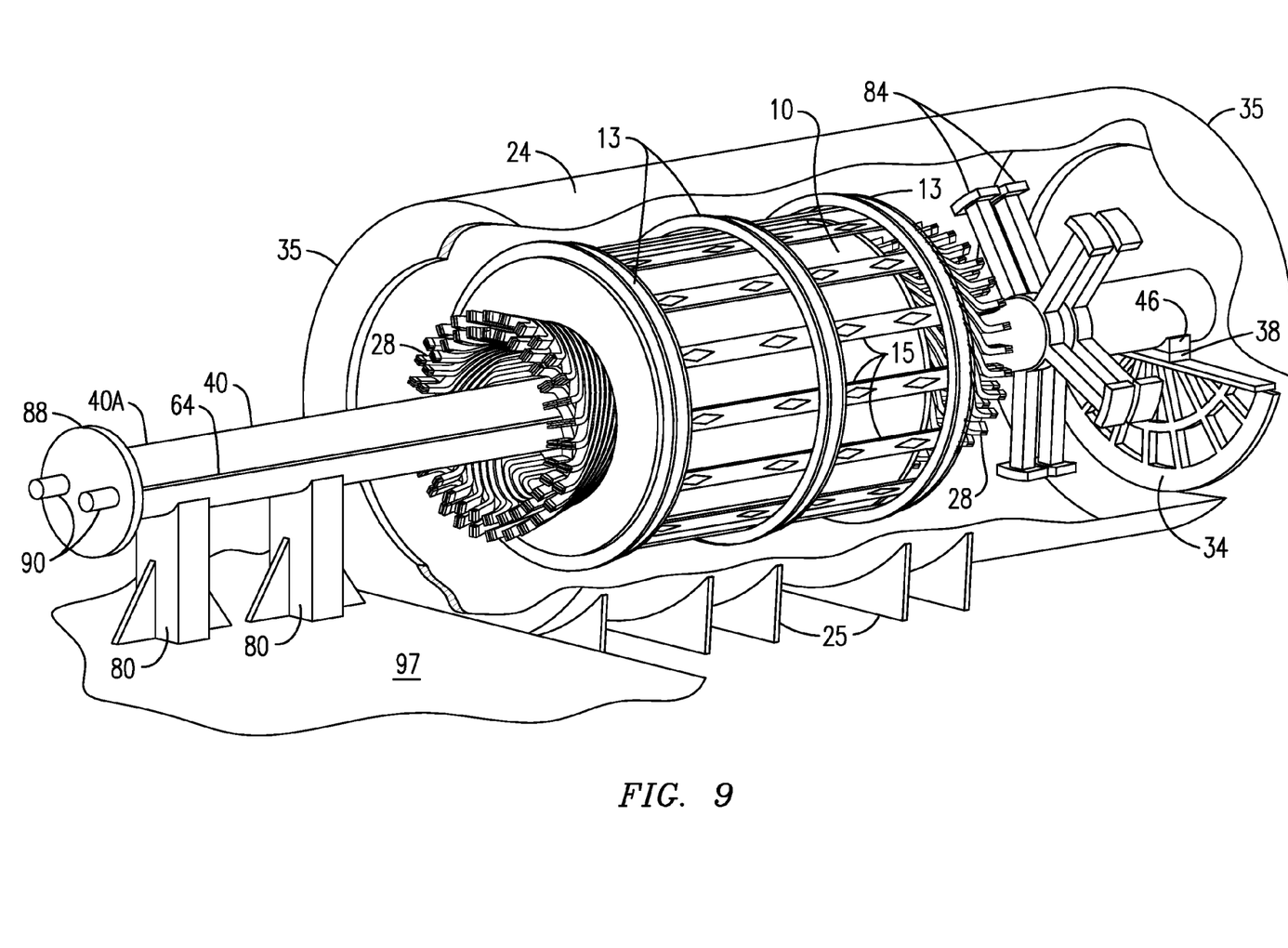

One or more of a plurality of pilot shaft supports 80 (see FIGS. 7, 9, and 10 for exemplary placement of the supports 80) may be placed outboard of the frame 24 to support the pilot shaft 40 as it extends from the frame 24 on the EE.

Sufficient turbine deck space must be available to allow the pilot shaft 40 to be inserted through the generator frame 24 from the EE towards the TE and extend from the frame 24 through the EE. In some facilities, an extension of the turbine deck, such as constructing platforms and/or temporarily removing interfering structures, including wall sections, may be required.

Figure 10:
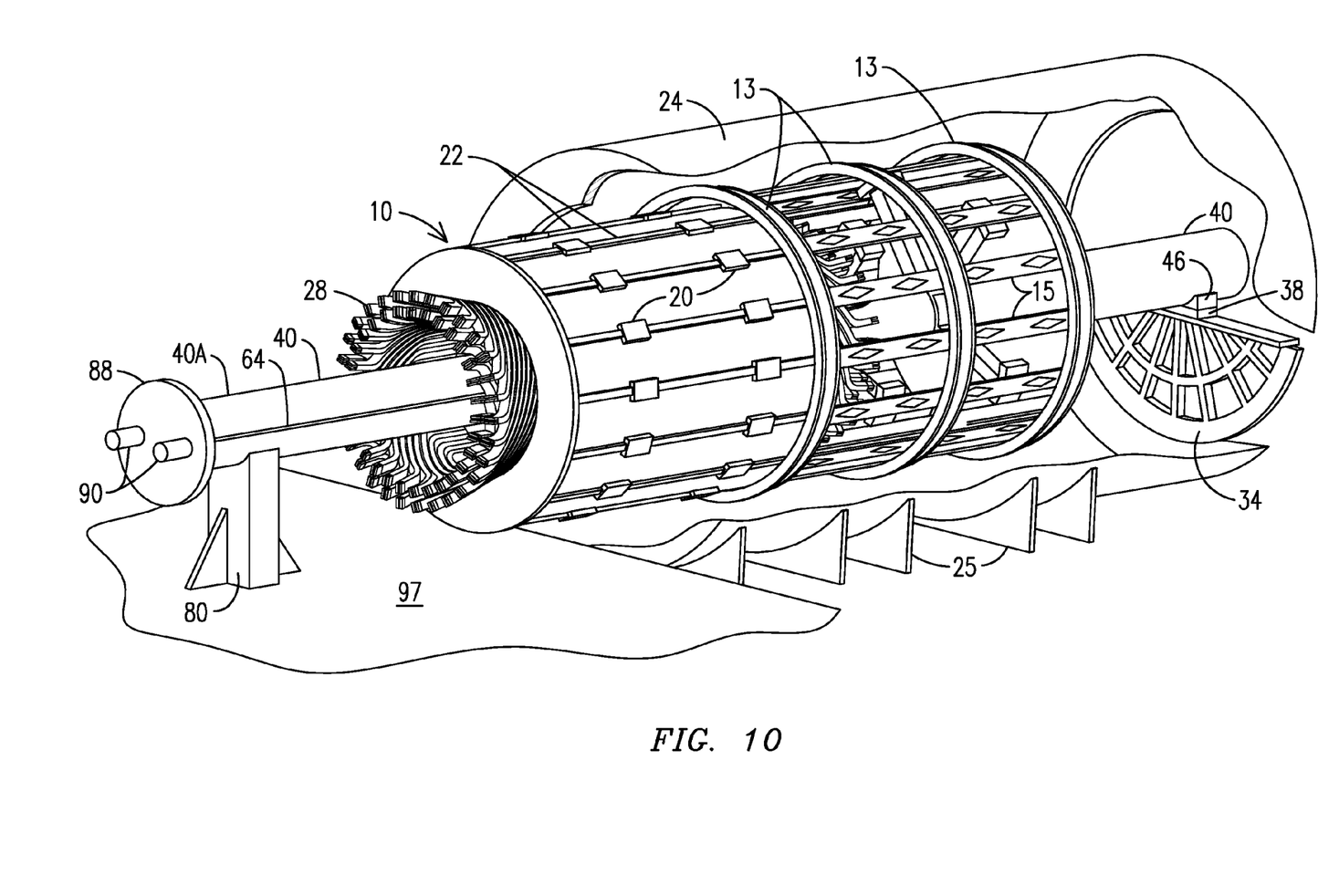
Figure 13:
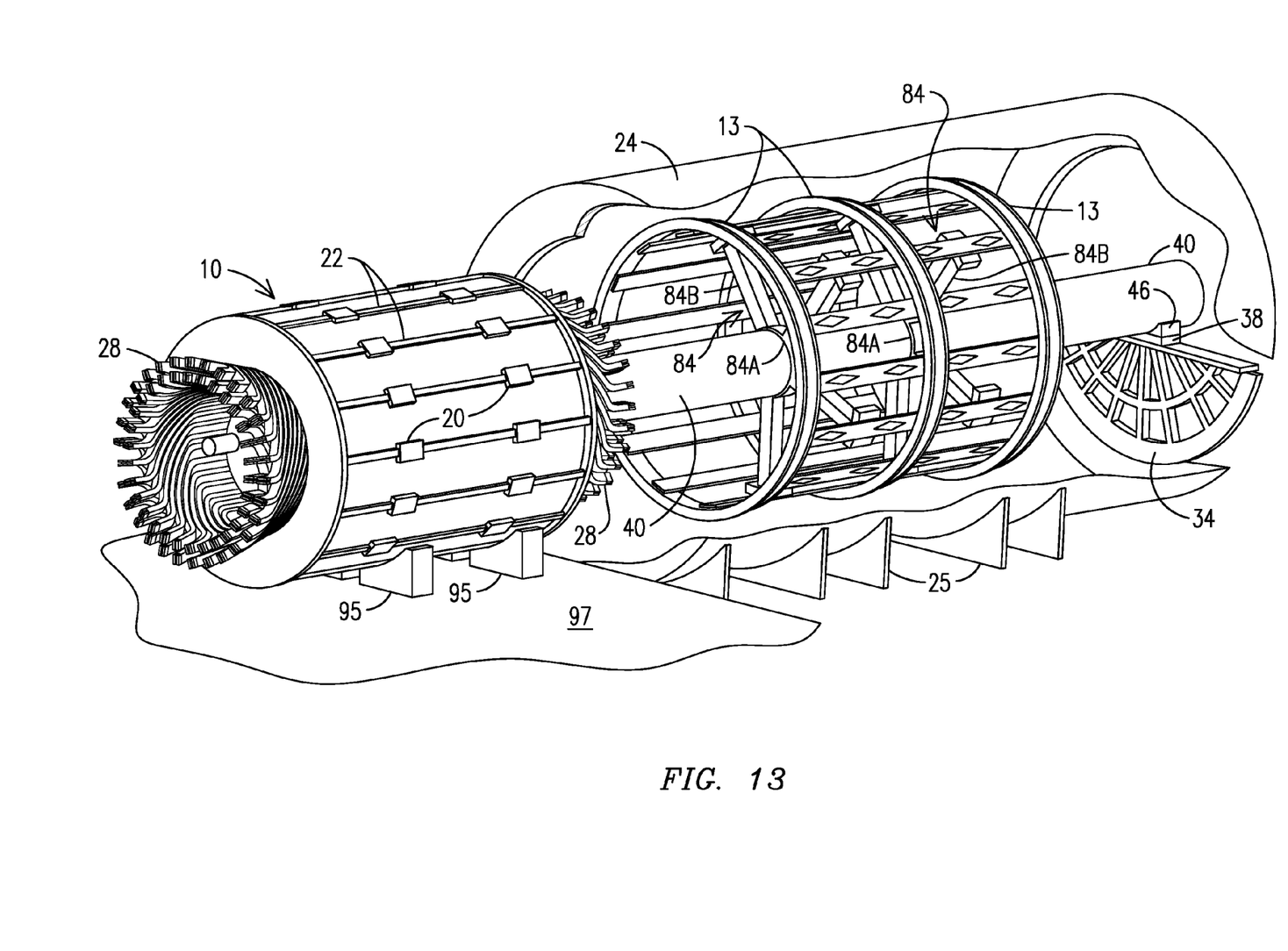

10b. Prior to installing the pilot shaft 40 completely through the TE structures described above, a plurality of spring bar support rings 84 (see FIGS. 3, 7, 9, and 10) are installed on the pilot shaft 40. These support rings 84 serve as intermediate supports for the pilot shaft 40 as the core 10 is extracted from the frame 24. Specifically, the support rings 84 are preinstalled on the pilot shaft 40 outboard of the core 10 toward the TE as the pilot shaft is being installed in the core opening 10A. As the core slides along the pilot shaft 40 toward the EE, these support rings 84 are manually repositioned on the pilot shaft 40 in a direction toward the core and attached to the spring bars 15 to follow the core along the shaft. FIGS. 10 and 13 illustrate the spring bar support rings 84 attached to the spring bars 15.

Each support ring 84 comprises an annular center structure 84A with spokes 84B extending therefrom. The spokes 84B are coupled to the spring bars 15 as the core slides along the pilot shaft and out of the frame. The spring bars 15 are in turn affixed to the frame rings 13 as described above in conjunction with FIG. 1. The support rings 84 provide intermediate support of the pilot shaft 40 within the frame 24, thereby reducing the unsupported span length of the shaft as the core is slid along the shaft 40, particularly as the core center of mass moves towards the EE.

11. At this point in the removal process the eyebolt(s) 62 (See FIG. 8) referred to above are installed (if not previously installed at the step 8a above) on an outboard surface of the annular pilot shaft support 50 at the EE. Attach the tension cable 64 to the eyebolt(s) 62 and extend the cable 64 outwardly toward an end 40A of the pilot shaft 40 on the EE. See FIGS. 7, 9, and 10.

Figure 11:
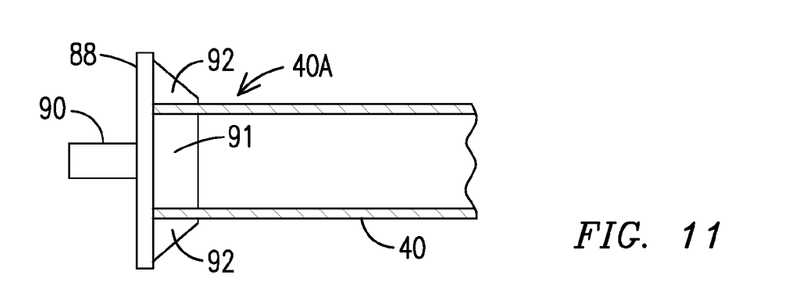

12. Install an end shaft reaction plate 88 at the end 40A (EE) of the pilot shaft 40. See FIGS. 9 and 11. The reaction plate 88 allows the axial force to be applied to the stator core 10 with the plate providing a mounting surface for one or more hydraulic jacks 90 that provide the axial force to slide the core 10 along the pilot shaft 40.

A boss 91 on a rear surface of the reaction plate 88 fits within the pilot shaft 40 to help secure and position the reaction plate 88 at the end of the pilot shaft 40. See in particular FIG. 11.

The reaction plate 88 further comprises a plurality of stiffening members, such as gussets 92, that reduce the effects of reaction plate bending when loaded. See in particular FIGS. 11 and 12.

Figure 12:
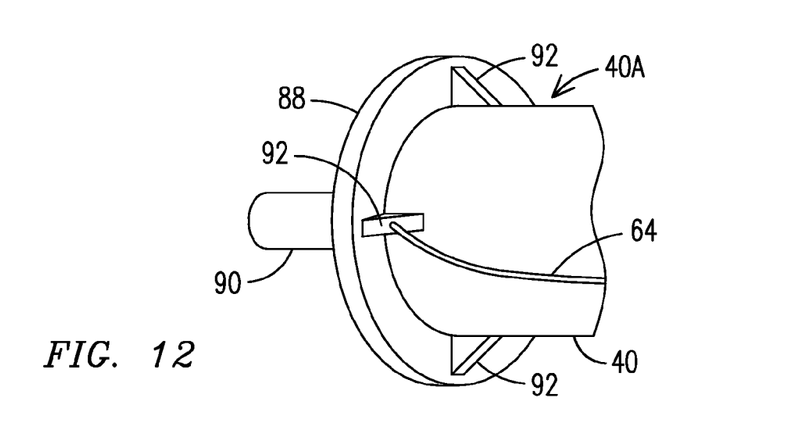

As further illustrated in FIG. 12, the gussets 92 may define one or more through holes through which the tension cable 64 is routed. Preferably an outer diameter of the end shaft reaction plate 88 is smaller than the bore 10A of the stator core 10.

13. Mount one or more hydraulic cylinders (jacks) 90, such as hollow plunger cylinders, onto an outboard face of the reaction plate 88. The tension cable 64 can be attached either directly or through an adapter component, to a piston of the hydraulic cylinders.

FIG. 7 illustrates the configuration of the various significant components at this point in the method of the present invention. However in FIG. 7 the frame 24 appears to be floating without necessary support members. Recall that to present an unobstructed view of the important components, the trunnions and the jacking tools (resting on the turbine deck surface) are not illustrated in FIG. 7. These components apply the necessary forces on the frame to maintain the frame in the orientation illustrated in FIG. 7.

14. After installing all tooling as described above, it may be necessary to raise the pilot shaft and its associated components at the locations (both ends) of the lift support bracket 34. Raising the pilot shaft is accomplished tightening the threaded member 42, which is illustrated in FIG. 5. Application of this lifting force overcomes the effects of stator core sag on the spring bars 15 prior to disconnecting the stator core 10 from the spring bars 15 as performed at step 15 below.

15. Disconnect the stator core 10 from the spring bars 15 by removing all hardware directly coupling the stator core 10/key blocks 20/key bars 22 to the spring bars 15.

In certain generator models this step requires removing the threaded fasteners 18 that pass through the spring bar 15 into the key block 20 and the keybar 22. See FIG. 1 for a detailed illustration of one technique for attaching the spring bars 15 to the core 10.

16. After the core 10 has been decoupled from the spring bars 15, stroke the hydraulic cylinders 90 (or any equivalent apparatus for applying an axial force to the stator core 10) causing the core 10 to travel along the pilot shaft 40 toward the EE. Pneumatic, electromotive and other axial force generating devices can be used in lieu of the hydraulic cylinders 90. As the core moves toward the EE the spring bar support rings 84 are manually moved toward the EE immediately inboard of the core.

17. When the core 10 has traveled axially to a location near one of the EE pilot shaft supports 80, remove the pilot shaft support 80. See FIG. 9. At this time it may be preferable to relocate the remaining pilot shaft supports 80 outboard of the EE frame end to provide necessary support to the pilot shaft 40 and the core 10 as the core continues to move out from the frame 24.

18. Continue moving the core 10 along the pilot shaft 40 until each spring bar support ring 84 can be properly positioned. For example, when the core 10 clears the spring bar bolting locations nearest the TE, a spring bar support ring 84 can be installed at that location. It is desirable to use existing through-holes in the spring bars 15 that had been used to attach the spring bars to the core 10 for attaching a spring bar support ring 84 to the spring bars 15. See FIGS. 10 and 13.

19. Continue traveling the core 10 along the pilot shaft 40 until the core begins to emerge through the frame face at the EE end. As the core 10 clears each spring bar bolting location within the core bore 10A, install another spring bar support ring 84 proximate a TE surface of the core 10. Note that as the core reaches the EE, the support bracket 34 must be removed to avoid interference with the emerging core.

20. As the core 10 emerges from the generator frame, a plurality of core supports 95 (see FIG. 14) can be placed between the outer surface of the stator core 10 near the 6 o'clock position and a turbine deck 97. These core supports 95 must be manually relocated or additional supports supplied as the core emerges from the frame 24. The core supports 95 maintain a proper core load distribution on the turbine deck 97.

21. When the core 10 reaches the end of the pilot shaft 40 as illustrated in FIG. 13, a gantry or overhead crane (or another lifting/pulling equipment, which is not illustrated in the figures) may be utilized to remove the core 10 from the pilot shaft 40. This removal step is required only if the wound core that was removed from the frame will be replaced with another wound core. However, if the removed wound core will be refurbished and reinstalled in the frame, the pilot shaft 40 may remain within the core bore to facilitate the reinstallation process.

22. Remove the end shaft reaction plate 88 from the EE side of the pilot shaft 40 and reposition the plate 88 to the TE side of the pilot shaft 40.

The following steps are executed to install a replacement core or the same core in the generator frame.

1. Prepare a replacement core or use an existing core to be returned into the frame 24 by moving the eyebolts 62 from the annular pilot shaft support 50 at the EE to the annular pilot shaft support 50 at the TE. Now the eyebolts 62 face the end shaft reaction plate 88 on the TE of the pilot shaft 40. Install the tension cable 64 for use in applying an axial force to the core 10, pulling the core along the pilot shaft 40 into the frame 24 toward the TE.

2. Activate the hydraulic cylinders (or similar axial force producing devices) to produce an axial force to move the stator core 10 along the pilot shaft 40 toward the TE, moving the intermediate pilot shaft supports 80 and the core supports 95 as necessary to support the pilot shaft 40 and the core 10.

3. As the core 10 approaches a spring bar support ring 84 disconnect the support ring 84 and move it ahead of the core toward the TE. The spring bar support rings 84 reduce the unsupported length of the shaft 40 as loaded by the core 10. The support rings 84 must be removed as the core is moved along the shaft towards the TE to eliminate interference with the core as it travels on the shaft.

4. When the core has reached its final axial position in the frame 24, reinstall the lift support bracket 34 to the EE frame face to support the shaft 40.

5. Reattach the core 10 to the frame 24 by installing the hardware that couples the spring bars 15 to the key blocks 20 and the key bars 22.

6. With the core 10 fully supported by the spring bars 15, disassemble and remove the pilot shaft 40, the reaction plate 88 (now on the TE), any remaining spring bar support rings 84, and all intermediate supports from the frame 24 and the turbine deck 97.

7. Reattach and reinsulate the parallel rings at the main leads interface where separation was previously required prior to the core removal process. One technique for accomplishing this involves brazing a copper sleeve over the extension of the parallel rings that was severed to remove the core. A new core may have a parallel ring interface that is designed to affix (bolting or otherwise) directly to the existing main leads, or main leads that are replaced but possessing a feature that allows such an electrical connection to be established.

Figure 14:
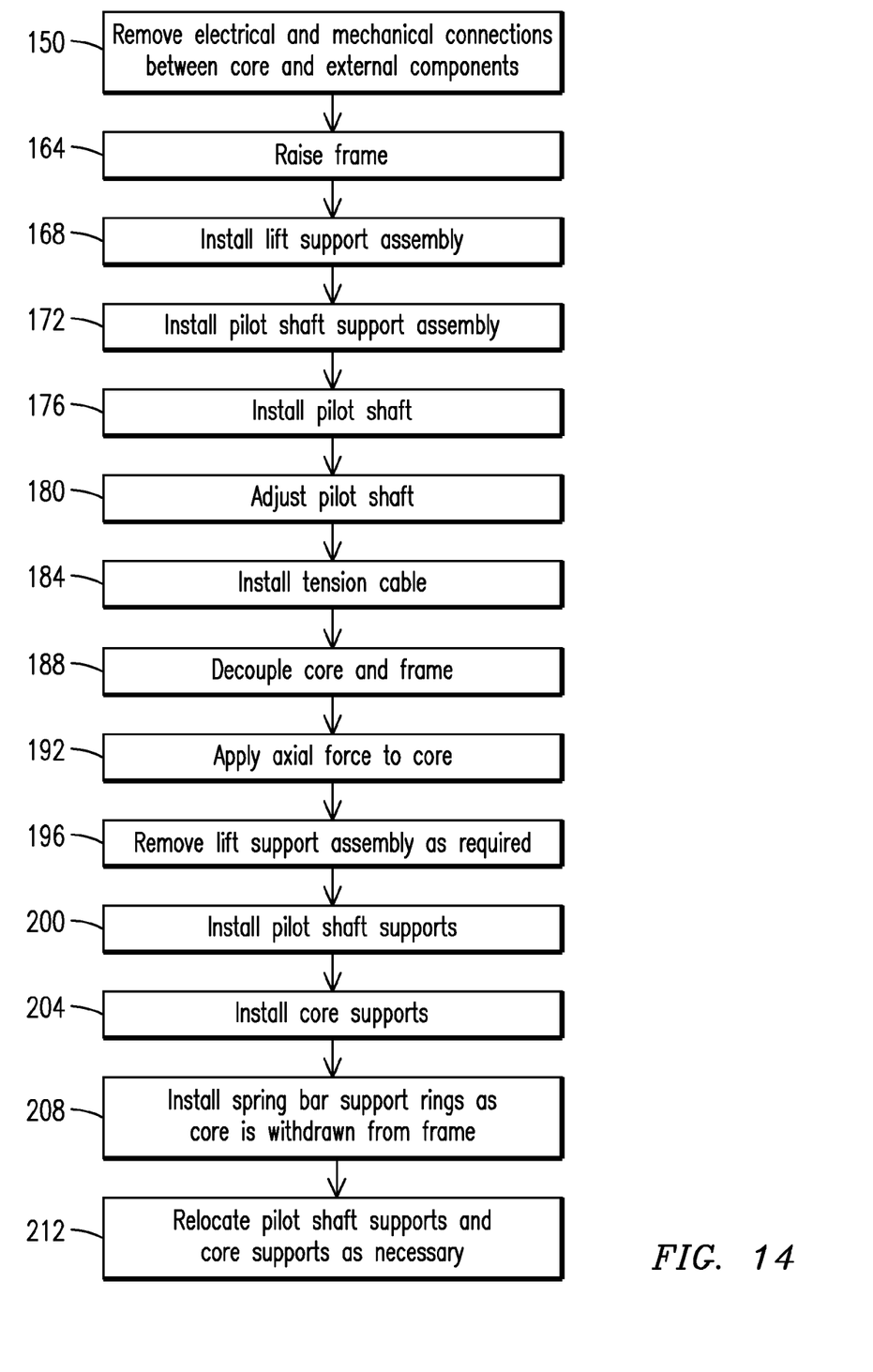
FIG. 14 illustrates a flow chart identifying steps for executing the method disclosed herein.

FIG. 14 illustrates the various steps associated with one embodiment of the present invention, the steps including:

Step 150 removing electrical and mechanical connections between the core and components external to the frame.

Step 164 raising the frame to allow sufficient clearance for horizontal removal of the core.

Step 168 installing the lift support assembly outboard of the core at each of an exciter end and a turbine end of the frame.

Step 172 installing a pilot shaft support assembly between an inner surface of a core bore and an outer surface of a pilot shaft at each of the exciter end and the turbine end of the frame.

Step 176 installing the pilot shaft through the first and second pilot shaft support assemblies and the core bore with the pilot shaft supported by the lift support assembly at the exciter end and the turbine ends.

Step 180 adjusting the pilot shaft as necessary for removal of the core.

Step 184 installing the tension cable.

Step 188 decoupling the core and the frame.

Step 192 applying an axial outwardly directed force on the core to slide toe core on the pilot shaft and out from the frame.

Step 196 removing the lift support assembly at the exciter end to allow the core to exit the frame at the exciter end.

Step 200 installing pilot shaft supports as necessary to support the pilot shaft as the core moves along the pilot shaft outside the frame.

Step 204 installing core supports as necessary to support the core as it moves along the pilot shaft.

Step 208 installing spring bar support rings as the spring bars are exposed as the core is moved along the pilot shaft.

Step 212 relocate the pilot shaft supports and the core supports as necessary to accommodate the core as it exits the frame. The step 212 is repeated as required until the core completely exits the frame.

Although the present invention has been described for removing the wound core from the exciter end of the frame, similar method steps would be executed to remove the core from the turbine end of the frame. Extraction from either end is within the scope of the claims.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for removing a generator core, with windings, from a generator frame, the method comprising:
   removing electrical and mechanical connections between the core and components external to the frame;
   after the removing step, installing a first lift support assembly outboard of the core at an exciter end of the frame and installing a second lift support assembly outboard of the core at a turbine end of the frame;
   installing a first pilot shaft support assembly between an inner surface of a core bore and an outer surface of a pilot shaft at the exciter end of the frame and installing a second pilot shaft support assembly between the inner surface of the core bore and the outer surface of the pilot shaft at the turbine end of the frame, the first and second pilot shaft support assemblies each supporting the pilot shaft by directly contacting the outer surface of the pilot shaft;
   installing the pilot shaft through the first and second pilot shaft support assemblies and the core bore, the pilot shaft supported by the first and second lift support assemblies at the respective exciter end and the turbine end;
   decoupling the core and the frame; and
   activating an axial force-producing device to exert an outwardly directed force on the core to slide the core on the pilot shaft and out of the frame.

2. The method of claim 1 further comprising vertically raising the frame to allow withdrawal of the core from the frame.

3. The method of claim 1 wherein the first and second lift support assemblies each comprise a vertically adjustable upper surface for raising or lowering the pilot shaft.

4. The method of claim 3 the first and second lift support assemblies each further comprising a lift support bracket and a lift block disposed on an upper surface of the lift support bracket, the lift block adjustable for raising or lowering the pilot shaft, the lift support bracket attached to a frame end ring.

5. The method of claim 4 the first and second lift support assemblies each further comprising a shaft saddle on an upper surface of the lift block, the pilot shaft in contact with the shaft saddle.

6. The method of claim 4 each lift block further comprising a first and a second lift block segment each defining an inclined upper surface, and a threaded member connecting the first and second lift block segments, the method further comprising the step of adjusting the threaded member for controlling a distance between the first and second lift block segments and thereby raising or lowering the pilot shaft.

7. The method of claim 1 wherein the core slides out of the frame at one of the exciter end and the turbine end.

8. The method of claim 1 each of the first and second pilot shaft support assemblies further comprising one more fasteners extending from the first pilot shaft support assembly axially through the core bore to the second pilot shaft support assembly, the method further comprising tightening the one or more fasteners to urge a radially outwardly circumferential surface of each of the first and second pilot shaft support assemblies against an inner circumferential surface of the core bore.

9. The method of claim 8 each of the first and second pilot shaft support assemblies further comprising a concentric arrangement of an annular pilot shaft support and a load ring, each of the first and second annular pilot shaft supports having a first surface in contact with an outer circumferential surface of the pilot shaft and a second surface opposite the first surface in contact with a first surface of the load ring, a second surface of the load ring in contact with an inner circumferential surface of the core bore, the second surface of the pilot shaft support inclined relative to horizontal and the first surface of the load ring inclined relative to horizontal for interfacing with the second surface of the pilot shaft support.

10. The method of claim 9 further comprising a material layer disposed between the second surface of the load ring and the inner circumferential surface of the core bore.

11. The method of claim 1 further comprising installing one or more pilot shaft supports on the turbine end if the core is withdrawn from the frame at the turbine end or on the exciter end if the core is withdrawn from the frame at the exciter end, the one or more pilot shaft supports located outboard of the frame to support the pilot shaft as the core slides along the pilot shaft.

12. The method of claim 1 after the step of activating further comprising, installing one or more spring bar support rings on the pilot shaft, each spring bar support ring comprising a plurality of arms extending radially outwardly from the pilot shaft and each arm connected to spring bars disposed interior of the generator frame, the spring bar support rings installed as segments of the spring bars are exposed as the core is withdrawn from the frame.

13. The method of claim 12 wherein each spring bar support ring comprises an annular element encircling the pilot shaft, the plurality of arms extending from the annular element.

14. The method of claim 1 wherein the axial force-producing devices comprise one of hydraulic cylinders, a pneumatic device and an electromotive device.

15. The method of claim 1 further comprising a reaction plate attached to an end of the pilot shaft, wherein the axial force-producing device exerts a force on the reaction plate.

16. The method of claim 1 after the step of activating further comprising, installing one or more core supports beneath the core as the core is withdrawn from the generator frame.

17. The method of claim 1 further comprising removing the lift support assembly at the exciter end of the frame when the core reaches the lift support assembly at the exciter end.

18. The method of claim 1 further comprising extending a tension cable between the core and the axial force producing device such that by activating the axial force-producing device the tension cable exerts an outwardly directed force on the core.

19. The method of claim 18 further comprising attaching a reaction plate to an end of the pilot shaft with the tension cable attached to the reaction plate, wherein the axial force-producing device exerts an outwardly directed force on the reaction plate, thereby exerting an outwardly directed force on the tension cable to move the core along the pilot shaft.

* * * * *